United States Patent
Leiber et al.

(10) Patent No.: US 9,211,874 B2
(45) Date of Patent: Dec. 15, 2015

(54) BRAKE SYSTEM HAVING SIMULTANEOUS OR PARTIALLY SIMULTANEOUS PRESSURE GENERATION AND REDUCTION IN THE WHEEL BRAKES FROM DIFFERING WHEEL CYLINDER PRESSURE LEVELS

(75) Inventors: Heinz Leiber, Oberriexingen (DE); Anton V. Zanten, Ditzingen (DE); Christian Koglsperger, Geretsried (DE)

(73) Assignee: IPGATE AG, Pfäffikon (CH)

(*) Notice: Subject to any disclaimer, the term of this patent is extended or adjusted under 35 U.S.C. 154(b) by 145 days.

(21) Appl. No.: 13/145,854

(22) PCT Filed: Feb. 13, 2010

(86) PCT No.: PCT/EP2010/000904
§ 371 (c)(1),
(2), (4) Date: Oct. 4, 2011

(87) PCT Pub. No.: WO2010/091883
PCT Pub. Date: Aug. 19, 2010

(65) Prior Publication Data
US 2012/0013173 A1   Jan. 19, 2012

(30) Foreign Application Priority Data

Feb. 13, 2009  (DE) .......................... 10 2009 008 944

(51) Int. Cl.
*B60T 8/40* (2006.01)
*B60T 8/32* (2006.01)
*B60T 13/74* (2006.01)

(52) U.S. Cl.
CPC ............. *B60T 8/3265* (2013.01); *B60T 8/4077* (2013.01); *B60T 13/745* (2013.01)

(58) Field of Classification Search
CPC .... B60T 8/3265; B60T 8/4077; B60T 13/745

USPC ........... 303/10, 11, 155, 113.5, 115.1, 115.2, 303/115.4
See application file for complete search history.

(56) References Cited

U.S. PATENT DOCUMENTS 4,930,845 A    6/1990 Bleckmann et al.
8,215,722 B2 * 7/2012 Burkhard et al. ............... 303/20
(Continued)

FOREIGN PATENT DOCUMENTS

DE    3632836 A1    3/1988
DE    3809099 A1    9/1989
(Continued)

OTHER PUBLICATIONS

The International Preliminary Report on Patentability issued in related International Application No. PCT/EP2010/000904 on Sep. 6, 2011.

*Primary Examiner* — Bradley King
(74) *Attorney, Agent, or Firm* — Panitch Schwarze Belisario & Nadel LLP

(57) ABSTRACT

A braking system may include a brake booster, the piston-cylinder system of which is driven by an electric motor, wherein at least one working chamber of the piston-cylinder system is connected by hydraulic lines to at least two wheel brakes, a wheel brake being allocated a 2/2-way switching valve in each case and the hydraulic connection lines between the wheel brakes and the piston-cylinder system being closable, optionally separately or jointly, by means of the 2/2-way switching valves, so that a pressure can be adjusted in the wheel brakes one after the other in terms of a multiplex method and/or simultaneously. The electric motor and switching valves may be activated by a control device configured to adjust or control the piston movement and piston speed during the pressure generation and pressure reduction as a function of the pressure-volume characteristic of the wheel brakes.

34 Claims, 5 Drawing Sheets

(56) References Cited

U.S. PATENT DOCUMENTS

2009/0115247 A1* 5/2009 Leiber et al. .................. 303/154
2012/0306261 A1* 12/2012 Leiber et al. .................. 303/146
2013/0093237 A1* 4/2013 Dinkel ............................ 303/10

FOREIGN PATENT DOCUMENTS

| WO | WO-9423976 A1 | 10/1994 |
| WO | WO-03082645 A1 | 10/2003 |
| WO | WO-2006111393 A1 | 10/2006 |

* cited by examiner

BRAKE SYSTEM HAVING SIMULTANEOUS OR PARTIALLY SIMULTANEOUS PRESSURE GENERATION AND REDUCTION IN THE WHEEL BRAKES FROM DIFFERING WHEEL CYLINDER PRESSURE LEVELS

CROSS-REFERENCE TO RELATED APPLICATIONS

This application is a 35 U.S.C. 371 National Stage Application of International Application No. PCT/EP2010/000904, filed Feb. 13, 2010, claiming priority from German Patent Application No. 10 2009 008 944.6, filed Feb. 13, 2009, the entire contents of which are incorporated herein by reference in their entirety.

The present invention relates to a braking system according to the preamble of claim 1.

PRIOR ART

In ABS/ESP, the precision and the dynamics of the pressure course determine the control quality and therefore the braking path and the stability of the vehicle. Rapid and fine pressure control is decisive for good control. Apart from the electro-mechanical brake EMB, all hydraulic systems work with 2/2-way magnetic valves. The braking manual, $2^{nd}$ edition from 2004, page 114-119 with literature information provides the detailed basic information in this regard. Without special measures, these valves have purely digital switching behaviour, i.e. they are either open or closed (open/closed). Owing to the rapid closing, depending on the pressure gradient, pressure oscillations with a large amplitude occur, which have an effect on the wheel behaviour and above all cause noises. The pressure gradient, in this case, depends on the differential pressure, which fluctuates strongly in the control range between $\mu=0.05$ (ice) and $\mu=1.0$ (asphalt dry) and also depends on the sharply fluctuating THZ pressure of the brake booster. The meterability of the often clocked pressure generation amplitude in the region of 1-10 bar (desired value) is often only relatively imprecise. An improvement can be achieved by a complex PWM control of the 2/2-way magnetic valves. The transition from pressure generation to pressure holding, in particular, can be influenced thereby, so the pressure oscillations and the noise become less. This PWM control is difficult and relatively imprecise, because it has to take into account the pressure gradient, the pressure amplitude and also the temperature. This PWM control is not used for the pressure reduction.

A method for controlling pressure by means of an electric motor and a piston control is described in EP 06724475. The HZ piston movement of the brake booster determines the pressure control here and therefore has considerable advantages with regard to precise pressure control and variable gradients. EP 06724475 also describes the pressure control of a plurality of wheel brakes by means of the so-called multiplex method (MUX method). Thus, it is described, inter alia, that the 2/2-way magnetic valves are to have a large flow cross section with a negligible throttle effect and the lines from the piston-cylinder system to the brake cylinder are to have a negligible flow resistance. It is also stated that the pressure reduction can take place simultaneously at two wheel brakes if approximately the same pressure level prevails at the start.

Despite these measures described in EP 06724475, the multiplex method has the drawback that with an unequal pressure level in two wheel brakes, a simultaneous pressure reduction is not possible as in the dimensioning described in EP 06724475 a pressure equalisation can take place here between two to four wheel brakes during the pressure reduction, if the flow resistance of the HZ or THZ to the wheel cylinder is too small. Additionally, there is the fact that two or more pressure reduction requirements, which easily occur with a time delay with respect to one another, can also not be carried out simultaneously or partially simultaneously because of the problems mentioned above of the possible pressure equalisation between the wheel cylinders. This is problematical, especially, as in particular the time delay of pressure requirements of the same sign can certainly occur to an increased extent.

As mentioned above, pressure reductions and pressure generations can take place simultaneously or partially simultaneously. "Simultaneously" is referred to when two or more magnetic valves are opened simultaneously and closed simultaneously. The pressure setting is called "partially simultaneous" when two or more magnetic valves are either opened in a time delayed manner or are closed in a time delayed manner.

Furthermore, no simultaneous pressure generation is provided in EP 06724475. This results in the fact that a possible pressure increase can briefly not be carried out, which possibly results in a longer braking path.

OBJECT OF THE INVENTION

The object of the invention is to further improve the multiplex method known from EP 06724475 in such a way that a simultaneous or partially simultaneous pressure reduction and pressure generation of two or more wheel cylinders can take place from different pressure levels.

ACHIEVEMENT OF THE OBJECT

The object is achieved according to the invention with a braking system having the features of claim 1. Further advantageous configurations of the braking system according to claim 1 emerge from the features of the sub-claims.

The invention is advantageously distinguished in that a simultaneous or partially simultaneous pressure reduction and pressure generation are also possible at different pressure levels of all the wheel brakes. This is achieved by correspondingly high piston speeds, the dimensioning of the flow resistances RL of the line from the 2/2-way magnetic valve to the working chamber of the piston cylinder system (HZ or THZ) and of the flow resistance RV of the 2/2-way magnetic valve. The condition applies that the flow resistance RL has to be smaller than the flow resistance RV. It is particularly advantageous when the flow resistance RL is smaller than the flow resistance RV by the factor 1.5 to 3. It is particularly advantageous when, in addition, the flow resistance RVR of the hydraulic line from the magnetic valve to the wheel cylinder is also taken into account, the latter advantageously being selected to be considerably smaller than the flow resistance RV of the magnetic valve.

In an improved configuration of the invention, it can be taken into account that the total flow resistance (RL+RV) is designed in such a way that with a maximum HZ piston dynamic, which corresponds to the maximum motor dynamic of the drive of the brake booster, and with two or more open magnetic valves, because of the simultaneous volume intake or volume output of the wheel cylinder brakes, no pressure equalisation can briefly take place (i.e. within the valve opening times).

Care therefore has to be taken in the design of the switching valves that a very small flow resistance is achieved which does not fall below the minimum described above. Care is to be taken that with a simultaneous pressure reduction, a sufficient pressure difference is present between HZ or THZ and the wheel cylinder, so that with a joint pressure reduction, no pressure equalisation can take place between the individual wheel cylinders of the wheel brakes.

A further possibility of preventing the pressure compensation during a simultaneous pressure reduction or pressure generation is to reduce the flow cross section of the valves by a PWM activation and to thereby increase the flow resistance. It is advantageous here that even with simultaneous or partially simultaneous pressure generations and pressure reductions, the pressure gradients can thus be selected depending on the situation and there is no link to the pressure courses predetermined by the design of RL and RV and optionally RVR. Simultaneous or partially simultaneous pressure reductions or pressure generations with extremely different pressure levels in two or more wheels also become manageable as a result.

As during the pressure reduction, the maximum possible flow speed drops to low pressures and the pressure-volume characteristics of the individual wheels represent a non-linear function, a variable or different piston speed is absolutely necessary during simultaneous or partially simultaneous pressure reduction and pressure generation.

As a result of the volume flow from the wheel cylinder into the HZ or THZ during simultaneous or partially simultaneous pressure reduction, the piston thereof has to be readjusted by corresponding control or adjustment in order to maintain the pressure difference. The volume which flows here from the HZ or THZ into the wheel cylinder, without readjustment of the HZ piston, would lead to a pressure increase and statically to a pressure equalisation. This piston readjustment takes place primarily by means of the controller, which calculates the necessary pressure difference, accordingly determines the volume intake in the HZ and for this purpose uses the HZ pressure and advantageously a pressure model. When readjusting the HZ or THZ piston, care is to be taken that the HZ or THZ pressure is always below the minimum pressure level of all the wheel cylinders connected at that moment to the HZ or THZ via an open magnetic valve or switching valve. Something similar applies to the simultaneous or partially simultaneous pressure generation. The controller in turn specifies the pressure level of the pressure increase. The HZ or THZ pressure is adjusted accordingly by means of the piston stroke and the piston speed, in order to take into account the volume of the wheel cylinders of the wheel brakes for the pressure generation. When readjusting the HZ piston, care is to be taken that the HZ or THZ pressure is always above the maximum pressure level of all the wheel cylinders connected at that moment to the HZ or THZ by means of an open magnetic valve.

Both for the simultaneous, partially simultaneous or non-simultaneous pressure generation, and also for the simultaneous or partially simultaneous pressure reduction, knowledge of the pressure-volume characteristic of the individual wheel is highly significant. This is recorded in intervals for each wheel when the vehicle is at a standstill, in that the volume is detected by means of the corresponding piston stroke with knowledge of the HZ pressure or THZ pressure. The process takes place with a relatively small dynamic, so the wheel cylinder pressure corresponds to the pressure in the HZ or THZ.

As is known, there is a large pressure difference in highly dynamic processes in the pressure control both in the pressure generation and in the pressure reduction as a result of the flow resistances in the switching valve, which is generally a magnetic valve, and in the hydraulic lines to the wheel cylinder. In each case, the controller determines the pressure change at the wheel brake, which is proportional to the braking torque. Therefore, conventional ABS/ESP systems can only statically measure the wheel pressure even with a pressure sensor at the exit of the magnetic valve. For dynamic measurement, a pressure model is used, the accuracy of which is limited. Moreover, it is expensive to install a pressure sensor for each wheel. In the system according to the invention with piston control, however, with knowledge of the pressure-volume characteristic, the wheel cylinder pressure can also be precisely adjusted when there is a different dynamic.

With a pressure generation and pressure reduction taking place simultaneously, partially simultaneously or non-simultaneously, two or more wheel cylinders are attended to simultaneously. The pressure difference determined by the controller is converted by means of the pressure-volume characteristics of the wheels into a corresponding piston stroke. With the aid of an additional pressure model, the pressure cylinder is also continuously calculated. As soon as the target pressure for a wheel has been reached, the respective magnetic valve is closed. The piston of the HZ or THZ then moves on to attend to the remaining wheel cylinders. In the last wheel cylinder to be adjusted, the pressure control is carried out by means of the piston stroke, which was previously calculated from the pressure-volume characteristic. The magnetic valve of the last wheel brake can then also be closed.

The pressure model for the piston control is very important for the braking system according to the invention in conjunction with the simultaneous and also non-simultaneous pressure reduction and pressure generation, as it is used to calculate or estimate the wheel cylinder pressures. The wheel cylinder pressures calculated thereby are used both to calculate closing and opening instants of the 2/2-way magnetic valves (switching valves) and also as the actual value of the control variable of the pressure controller in the multiplex method. In addition, the wheel cylinder pressures from the pressure model are used in superordinate controller structures (for example ABS/ESP, driver assistance functions such as ACC etc.).

As it is advantageous for the HZ or THZ pressure to be firstly brought close to the starting pressure of the wheel cylinder to be adjusted before the pressure change in the wheel cylinder, it is necessary for the wheel cylinder pressures to be continuously calculated and stored. This task is also taken on by the pressure model.

The pressure model is therefore extremely important for the control dynamics, the noise occurring in the process and the control accuracy, particularly in conjunction with the simultaneous or partially simultaneous pressure reduction and pressure generation.

The pressure model uses the HZ or THZ pressure as the input signal. The various wheel cylinder pressures are then calculated therefrom by means of the pressure model. The model parameters, such as, for example, equivalent flow resistance, equivalent line inductance and pressure-volume characteristic, can be adapted, in this case, by means of the temperature (for example ambient temperature or separate temperature sensor on a magnetic valve). If changes should occur in the transition behaviour, it is also possible by means of an adaptation, to adjust the parameters of the model.

The process of simultaneous or partially simultaneous pressure change is relatively seldom in a normal ABS/ESP braking process and therefore occurs more readily in marginal cases such as an asymmetrical or non-homogeneous road. It is therefore very important that the multiplexer can switch over rapidly from one wheel cylinder to the next. This is possible as the piston speed and therefore the pressure change speed is variably adjustable and thereby the piston can be activated with a maximum dynamic in extreme cases. Owing to the variability, it is possible in the normal case to reduce the piston speed and to use the maximum dynamic only in extreme cases. Furthermore, the switchover time between the beginning of the piston movement and opening or closing of the magnetic valve is in turn dependent on the pressure difference to be controlled and the absolute pressure in the wheel cylinder.

Care is to be taken in the design of the HZ or THZ that the HZ or THZ is a structure which is as stiff as possible when the magnetic valves or switching valves are closed, as the resilience or stiffness of the HZ or THZ has a significant influence on the switchover time. An HZ or THZ that is as stiff as possible with the associated liquid volume and also the connecting channels, for example RL, therefore allows very short switchover times.

To check and obviously correct the wheel cylinder pressures calculated by the pressure model during a relatively long control intervention, a comparison of the wheel cylinder pressure with the HZ or THZ pressure tales place at relatively long time intervals. When the piston is at a standstill and the magnetic valve is open, after a certain pressure settling time, a static equalisation is therefore carried out, which proceeds automatically because of the configuration of the pressure model without additional adaptation rules or extensions in the pressure model. The check can also take place when the slip predetermined by the controller or the wheel acceleration is not achieved. It is also possible, without a simultaneous or partially simultaneous pressure change, to work only on the basis of the pressure-volume characteristic and corresponding piston adjustment, proportionally to the controller requirement.

A braking system is described in EP 06724475, in which a path simulator is used. The braking system according to the invention may have a path simulator. However, a path simulator may be dispensed with for cost reasons. In this case, a feedback to the brake pedal may take place by means of the electric drive and a mechanical connection between the brake pedal and brake booster. The described braking system may also be used as a full brake-by-wire system without a mechanical connection to the brake pedal. It is also conceivable that, in parallel to the braking system, a THZ similar to the EHB may be used, which, supplies corresponding pressure by means of additional switchover valves, when the described braking system fails.

The invention will be described in more detail below with the aid of drawings, in which.

Figure 1:
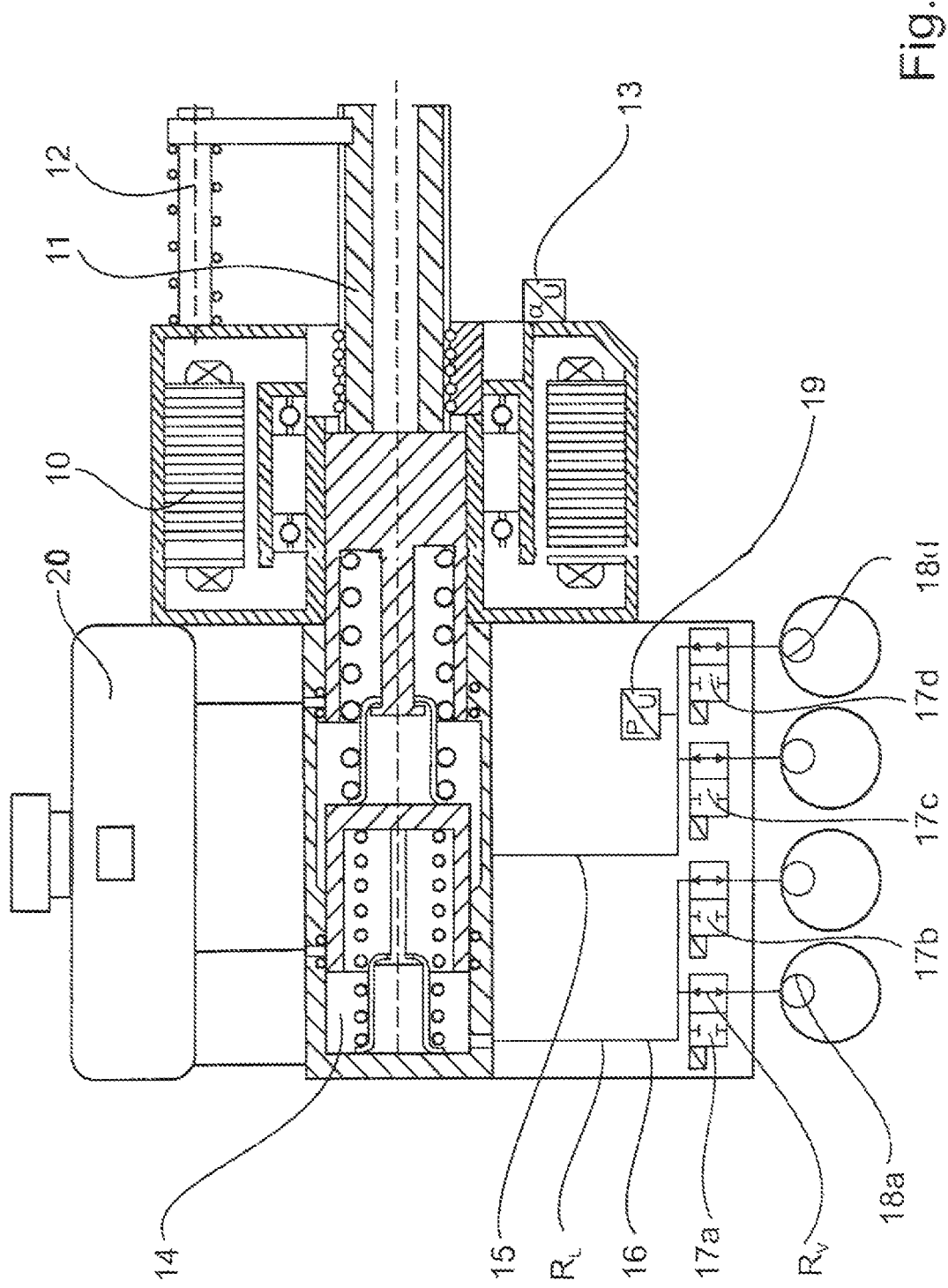
FIG. 1 shows the basic structure of the actuator system for pressure control.

FIG. 1 shows the basic structure of the braking system according to the invention consisting of HZ or THZ 14, EC motor 10, spindle 11 for driving the pressure rod piston, spindle resetting device 12 and angle of rotation sensor 13 to determine the position of the piston and to detect the rotor position or the piston stroke.

If the piston receives the adjusting command to generate a specific pressure, the corresponding piston movement takes place via the position sensor 13 and pressure sensor 19 in the pressure rod circuit by means of the previously recorded pressure-volume characteristic stored in a characteristic map. With subsequent short constant pressure, which is generally the case during a braking operation, the correlation comparison takes place on the basis of new measurement data using the stored characteristic map data. If there is a deviation, when the vehicle is stationary at a later time, the pressure-volume characteristic is recorded again individually for each wheel brake and the characteristic map is corrected. If the deviation is significant, for example at one wheel cylinder, an indication to look for a garage is given.

The pressure produced in the HZ or THZ arrives via the lines 15, 16 from the pressure piston rod and floating piston via the 2/2-way magnetic valves 17*a-d* at the wheel cylinders 18*a* and 18*d*. Instead of pressure rods and floating pistons, another piston arrangement or coupling by means of springs can also be used. The pressure rod piston is advantageously rigidly connected to the spindle, so the pressure rod piston can also be moved back by the drive for rapid pressure reduction.

The dimensioning of the flow resistances RL from the HZ to the magnetic valve 17*i* (wherein i=a, b, c, d) in the lines 15 and 16 and then of the flow resistance RV in the magnetic valve and flow resistance in the hydraulic connection to the wheel cylinder are also highly significant here. The two resistances RL and RV should be low, wherein it should apply that RL is very much smaller than RV, and the flow resistance from the magnetic valve to the wheel cylinder RVR is small in comparison to the flow resistance RV of the magnetic valve, preferably $$RL \leq RV/\text{factor},$$

wherein the factor should be 1.5 to 5, in particular 1.5 to 3, at room temperature. The 2/2-way magnetic valves 17*a-d* with the lines 15 and 16 and pressure sensor 19 are preferably integrated in a block, and the HZ or THZ can also be included for this.

If the adjusting command for pressure reduction takes place, the pressure adjustment via the piston stroke and then the equalisation with the pressure measurement in turn take place. The pressure generation and reduction correspond to the conventional BPV function. For this purpose, a supplementation with the components, for example pedal, pedal path sensor, path simulator inter alia, is necessary as described in the aforementioned EP 6724475. The braking system of EP 6724475, however, has the pressure control and modulation as its content and does not need all the above-mentioned components.

If a pressure modulation now takes place, for example for the ABS/ESP function, the MUX function is switched on. If, for example, the pressure is to be reduced at the wheel 18*a*, once the HZ or THZ 14 has produced a specific pressure in the lines 15 and 16 and wheel cylinder 18*b* and 18*d* beforehand by means of a motor 10, the magnetic valves 17*b* to 17*d* are closed.

If, by means of a corresponding piston stroke, the pressure reduction $p_{red}$ predetermined by the controller is achieved, the magnetic valve 17*a* is closed, and the piston of the HZ or THZ moves into the desired position predetermined by the controller. If thereafter, for example in the wheel cylinder 18*d*, a pressure generation $p_{gen}$ is to take place, the magnetic valve 17*d* opens and the piston is moved into the new desired position for the desired value $p_{gen}$. If a simultaneous or partially simultaneous pressure reduction $p_{red}$ is to take place in the wheel cylinders. 18*a* and 18*d*, the magnetic valves 17*a* and 17*d* are switched to be without current and therefore into the opened position and the magnetic valves. 17*b* and 17*c* are closed. The piston also moves into the new desired position here. These processes for the pressure modulation take place extremely fast with special switching conditions for the motor and magnetic valves. These are described in FIG. 2 and FIG. 3.

Figure 2:
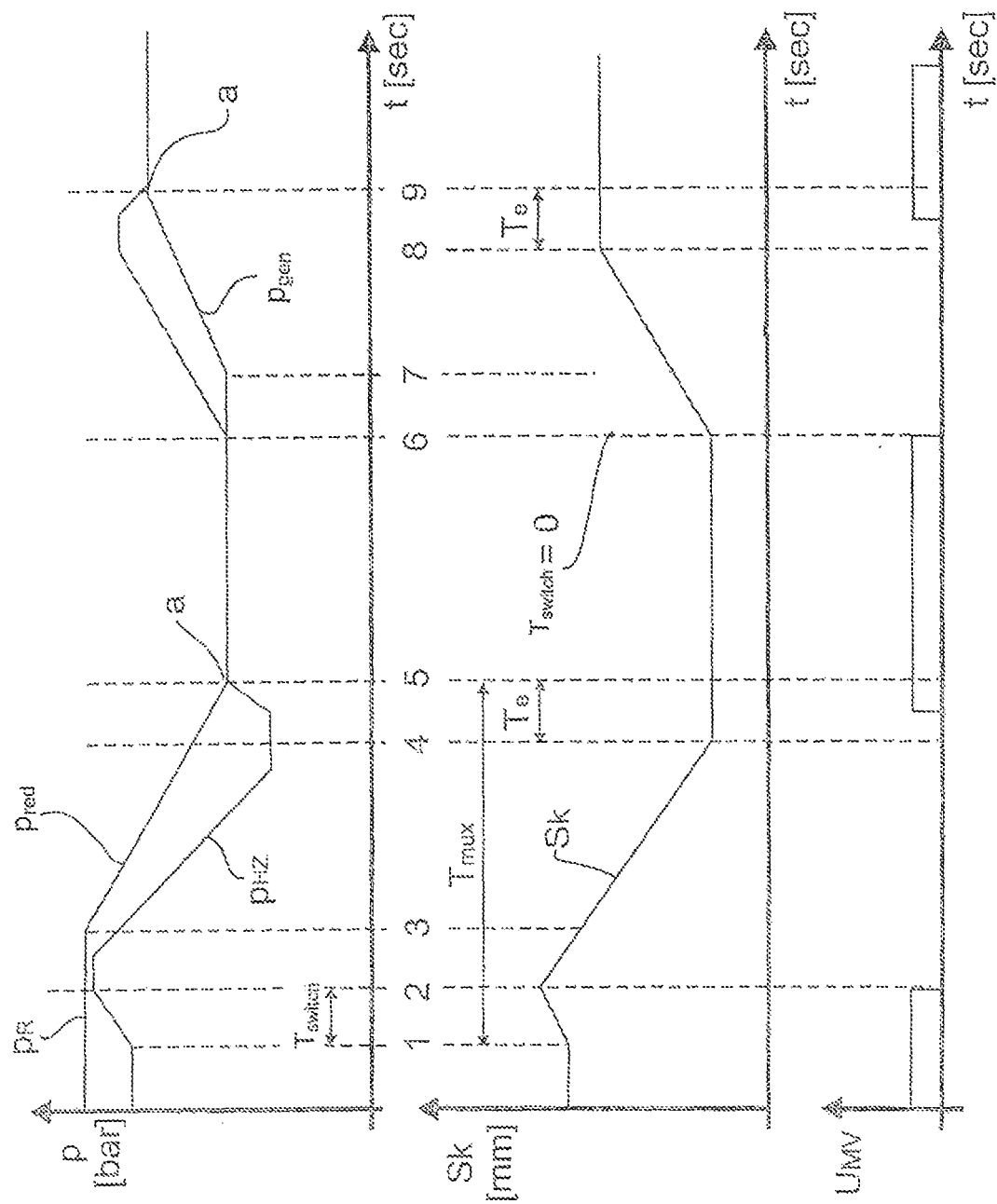
FIG. 2 shows the control cycle for the pressure control of a wheel cylinder.

FIG. 2 shows a control cycle in the MUX method for a wheel brake. In the upper x-y graph, the wheel cylinder pressure is shown schematically by $p_R$ and the HZ or THZ pressure is shown schematically by $p_{HZ}$. The position of the pressure rod piston over the time is plotted therebelow with the y-axis inscription $s_K$. The activation signals $U_{MV}$ for the magnetic valves are shown in the lower graph.

In the time course shown, a pressure reduction $p_{red}$ firstly takes place. A pressure generation $p_{ab}$ for a wheel brake then follows at the instant 6.

Before the instant 1, all the switching valves 17*a-d* are closed and the HZ piston is stationary. A pressure reduction command for the wheel shown takes place at 1. The so-called switchover time $T_{um}$ is shown between the instants 1 and 2, during which, using the pressure-volume characteristic of the main cylinder, an attempt is made with a piston displacement to adjust the pressure in the HZ to the wheel pressure known from the pressure model, so that during the valve opening at the end of phase 2, a pressure is already virtually adjusted in the HZ, which corresponds to the pressure in the wheel cylinder, so that a pressure equalisation between the HZ and wheel cylinder is virtually achieved. The necessary volume or piston stroke and especially the differential stroke that has to be taken from the wheel cylinder to bring the pressure to a specific or the required level, is now calculated as a function of the current wheel pressure and the required desired pressure at the wheel at 2 by means of the pressure volume characteristic. The HZ piston is now driven/controlled and adjusted accordingly and the respective switching valve 17*i* is simultaneously activated and opened. The time range between the instants 2 and 3 represents the entire small dead time or delay until an effect of the pressure reduction can also be seen in the wheel pressure. The HZ piston then approaches, between 3 and 4, the calculated desired position, which it has reached at the end of the phase 4. If, in the meantime, the desired pressure should increase again, for example by input from superordinate controllers, the motor would break off the process even earlier. If the desired position has been reached, to calm the flow conditions in the hydraulic system, a settling time $T_e$ is maintained in phase 4 to 5 in which the HZ piston is stationary before the switching valve 17*i* closes. A pre-activation of the switching valves is worked with here, the signal being brought forward by the closing time of the valve. The settling time 4-5 contributes to the more precise estimation of the wheel pressures, and reduces the noise when closing the magnetic valve at the instant a. The activation of the magnetic valve to close takes place taking into account the currently present actual pressure, the pressure gradient and the previously known closing time. In phase 5 to 6, all the switching valves 17*a-d* are again closed. The actuator would now have time to attend to further wheels. If, in the meantime, it does not have to change the pressure in the HZ, the switching time $T_{um}=0$ in a pressure generation requirement then following at the instant 6. The following pressure generation takes place analogously to the pressure reduction described above.

Figure 3:
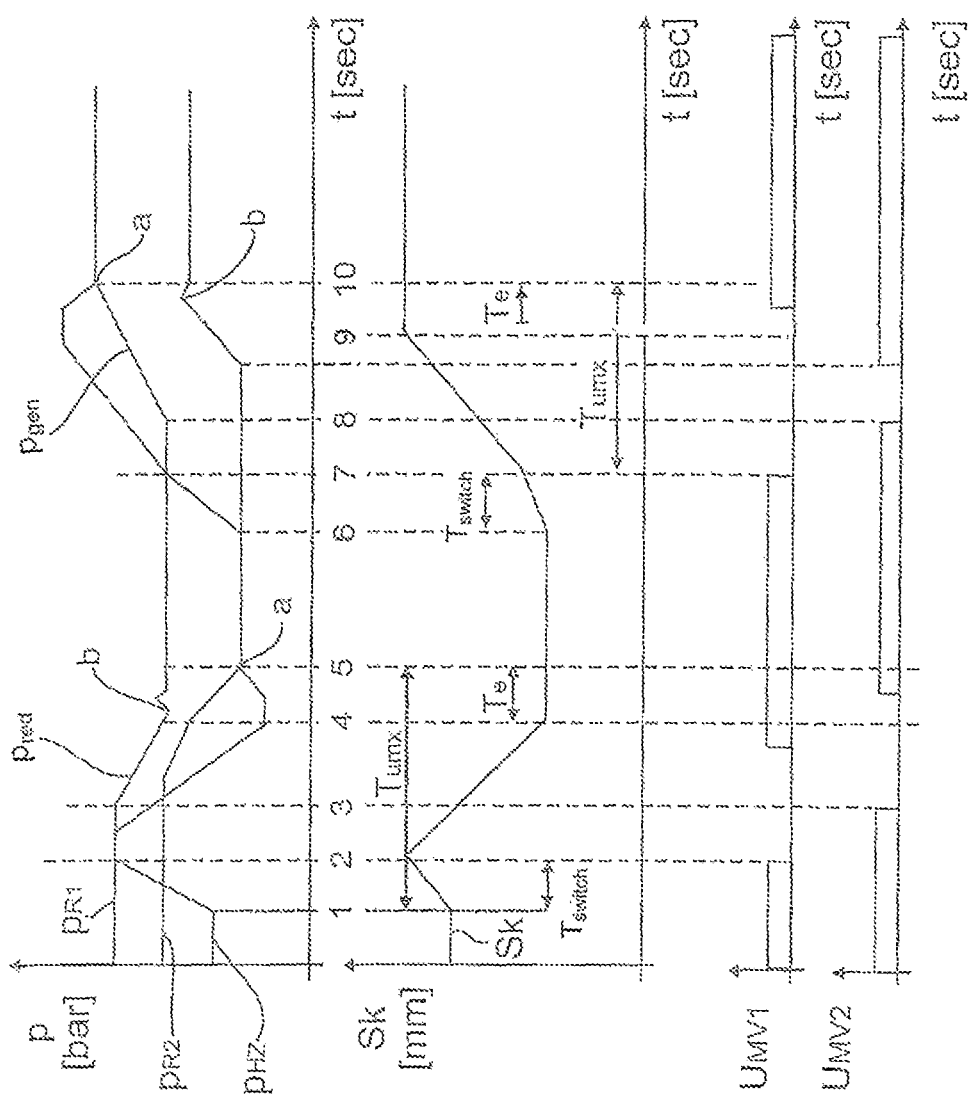
FIG. 3 shows the control cycle for the partially simultaneous pressure control of two wheel cylinders.

FIG. 3 differs from FIG. 2 in that a second wheel cylinder pressure $p_{R2}$ is additionally shown in the uppermost graph and a further graph for the activation signal of the second switching valve is added right at the bottom.

Basically, the figure describes the control sequence for a partially simultaneous pressure modulation $p_{red}$ and $p_{gen}$ in the wheel cylinders. Up to the instant 1, the HZ piston is stationary and the magnetic valves are all closed. Then a pressure reduction demand for the first wheel cylinder arrives. Simultaneously or else with a time delay, a second pressure reduction demand for a second wheel cylinder occurs. A simultaneous or partially simultaneous pressure reduction at two wheels is therefore now possible. The same also applies, of course, to three or four wheels. From instant 1 to instant 2, the switchover time $T_{um}$ is shown, in which, as described above, an attempt is made to approach the pressure of the first wheel cylinder known by means of the pressure model, so that when the switching valve belonging to the first wheel brake is opened, a pressure equalisation between the HZ and the first wheel cylinder is virtually already achieved. By means of the pressure-volume characteristic, during or at the end of the phase 1-2, the necessary volume that has to be taken from the first wheel cylinder is now calculated in order to bring the pressure to a specific level. If the reduction requirement for the second wheel cylinder is also already known, the required HZ piston stroke is also already calculated here by means of the stored pressure-volume characteristic. Basically, this computing step may, however, also firstly take place at the instant 3. The HZ piston now sets off at the instant 2 and the magnetic valve belonging to the first wheel brake is simultaneously activated and opened. The time range 2-3 is the total, dead time until an effect of the pressure reduction can also be recognised in the wheel cylinder pressure. As soon as it can be foreseen by means of the pressure model and the volume flow calculated therewith (instant 3), that the HZ pressure $p_{HZ}$ within the known valve opening time falls below the wheel pressure $p_{R2}$, the second magnetic valve $MV_2$ is activated and opened via $U_{MV2}$. Shortly before the instant 4, it can be foreseen by means of the pressure model and the volume flow or pressure gradient calculated therewith that the first wheel cylinder will reach the target pressure within the known valve closing time. Therefore, the magnetic valve $MV_1$ is now closed. At the instant 4, the valve $MV_1$ is then also closed and the volume flow in the valve $MV_1$ is stopped. Pressure oscillations in the wheel cylinder pressure at b result therefrom. The pressure oscillations in the wheel pressure can be reduced by a PWM activation of the magnetic valves. By chance, the HZ piston also reaches its desired position, which—as described above—was calculated beforehand, at the instant 4. The volume flow in the magnetic valve $MV_2$ can now be calmed in the settling time $T_e$ before this valve $MV_2$ is also closed at the instant 5. Because of the settling time, hardly any pressure oscillations occur during this process at the wheel cylinder at a. A PWM activation of the magnetic valves would not produce any advantages here, either. Following the phase 5 to 6, the sequence described above for the simultaneous pressure generation is repeated. It is important for the simultaneous pressure generation that, with the magnetic valve $MV_1$ open, the HZ pressure is always above the lowest wheel cylinder pressure in order to obtain a positive pressure gradient and to avoid a pressure equalisation between two or more wheels. In general, with a simultaneous or partially simultaneous reduction, the PWM activation of the magnetic valves would produce the advantage that the pressure gradients could also be influenced on-line with simultaneous or partially simultaneous pressure reductions or generations.

Figure 4:
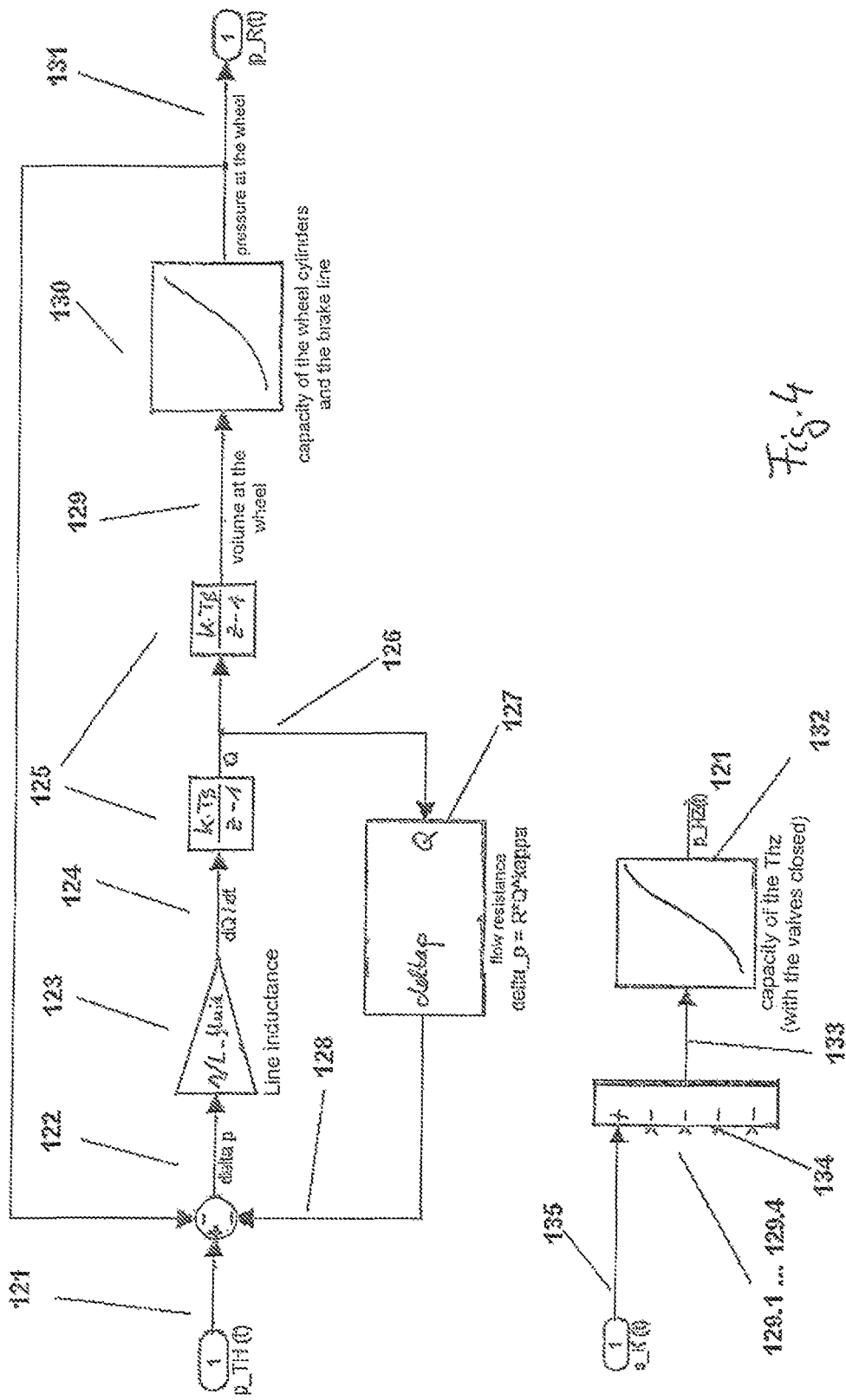
FIG. 4 shows a block diagram of a pressure model.

FIG. 4 shows a possible pressure model for calculating the individual wheel cylinder pressures. As the input signal 121, the pressure model uses the HZ pressure $p_{HZ}(t)$, which only corresponds to the wheel pressure in the wheel brake in the settled state (static). The model 122 to 131 is designed four-fold for a vehicle with four wheel brakes. Alternatively, it is possible for the pressure model to calculate the HZ pressure 121 by means of a stored pressure-volume characteristic 132 of the HZ. The wheel pressure can therefore also be dynamically adjusted by means of a corresponding HZ position or piston stroke. The object of the pressure model is to obtain a dynamic or high-frequency estimation of the wheel cylinder pressure $p_R(t)$. The function of the individual signals and signal blocks will be described in more detail below.

Figure 5:
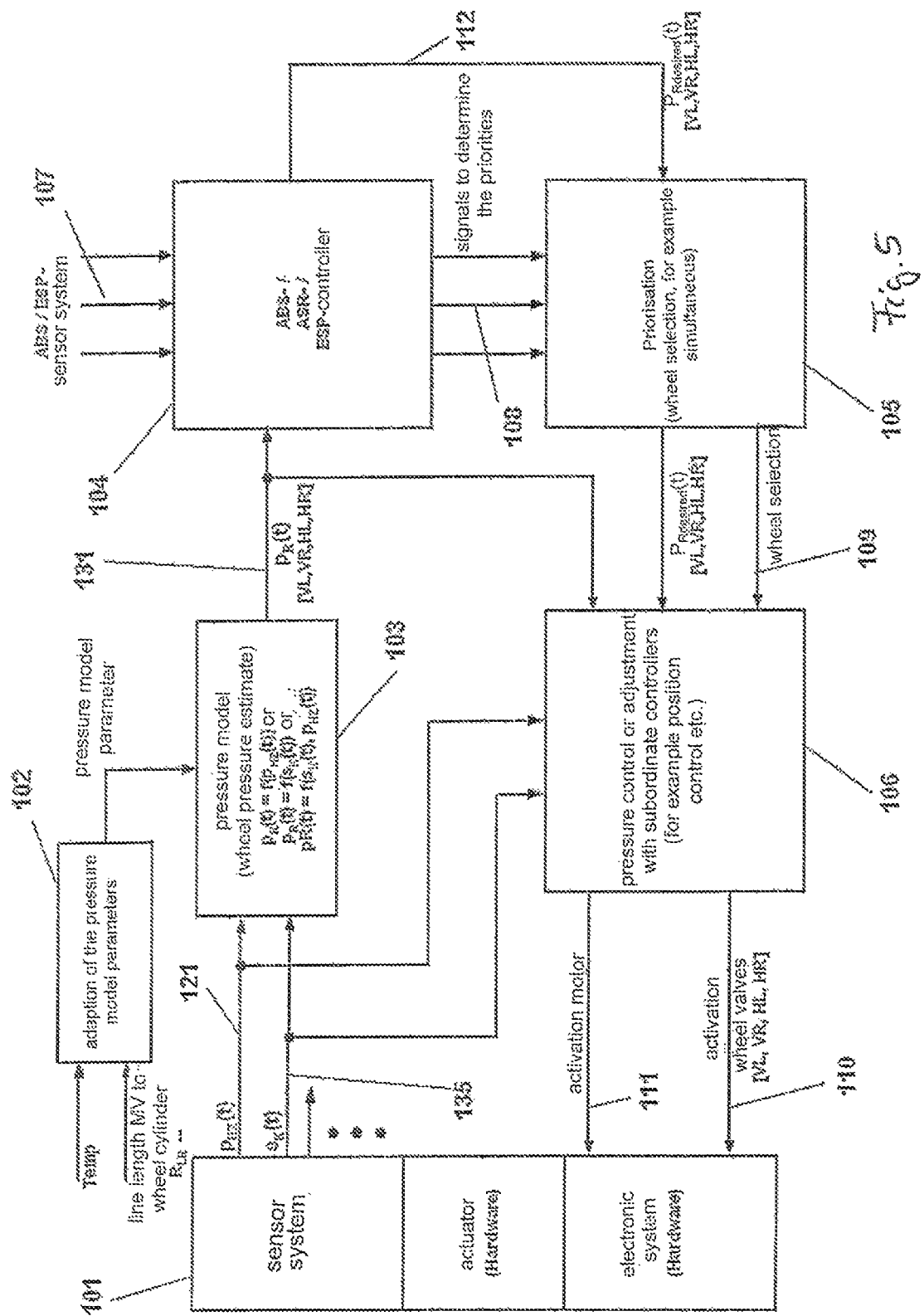
FIG. 5 shows a signal flowchart of a possible software structure.

The piston stroke or piston position $s_K(t)$ 135 of the HZ is used as the input signal for the pressure model 103 (see also FIG. 5). The volume in the HZ 133 is calculated by means of the summation point 134 from the volume at the wheel 129.1 to 129.3 and the piston stroke $s_K(t)$ 135. The invention understands wheel volume to mean the volume of the wheel brake, the feed lines and the volume of the working chamber of the HZ. The HZ pressure $p_{HZ}(t)$ 121 is calculated by means of the volume-pressure characteristic 132 of the HZ. An equalisation of the HZ pressure signal of the pressure sensor with the simulated signal 121 is also conceivable. This measure is used to diagnose a pressure sensor failure, as the piston position of the HZ correlates with a specific pressure by means of the characteristic 132. For diagnosis, the phase current of the motor can also be used.

If only the HZ pressure is used as the input signal of the pressure model, the signal path 135 to 121 is unnecessary. The HZ pressure 121 is then obtained directly from the pressure sensor.

The differential pressure 122, which leads via the model block "hydraulic equivalent inductance or line inductance" 123, which stands for the mass and/or the inertia of the brake fluid, and an integrator 126, to the through-flow Q, is obtained by means of a summation point. The signal block 127 takes into account the flow resistance of the hydraulic path from the HZ via the valve through the brake line to the wheel cylinder. The model parameter equivalent flow resistance R corresponds to the hydraulic resistance of the path from the piston-cylinder system 14, HZ via the switching valve 17a, 17b, 17c, 17d to the wheel cylinder of the wheel brake in laminar conditions. In addition, the signal block 127 takes into account a parameter (kappa), which, within the hydraulic path from the piston-cylinder system 14, HZ via the switching valve 17a, 17b, 17c, 17d to the wheel cylinder of the wheel brake, represents a weighting of the flow ratios laminar/turbulent. By means of the second integrator 125, the current volume at the wheel 129 is obtained from the pressure flow Q 126 and from this is obtained the pressure at the wheel 131 by means of the volume-pressure characteristic of the wheel cylinder 130, which describes the capacity or the stiffness of the wheel cylinder and the connected brake lines. Furthermore, the possibility exists in the pressure model 103, (see FIG. 5) of also simulating the hysteresis present in reality, inter alia because of seals etc. This increases the estimation accuracy of the pressure model. The pressure-volume characteristics used are adapted or recorded statically at the vehicle start and stored as a function with the associated function parameters or as a table.

FIG. 5 shows a possible signal flowchart of the software structure. Reference numeral 101 in this case represents the actuator $p_{HZ}(t)=f(s_K(t))$, which is shown in detail in FIG. 1. The sensor system of the actuator supplies the HZ pressure 121 and the HZ piston stroke 135 by means of the evaluation of an angle of rotation sensor. Further sensor signals, such as driver's desired pressure, pedal position, motor phase currents, battery currents etc. are not listed here, but can also be taken into account.

The pressure model 103 calculates the various wheel brake pressures 131 from the signals 121 and 135 as a function of the time pressure course $p_{HZ}(t)$ in the HZ and/or of the DK piston stroke $s_K(t)$, or as a function of both, wherein $p_R(t)=f(p_{HZ})$ or $p_R(t)=f(p_{HZ}, s_K)$ or $p_R(t)=f(s_K)$.

By means of an adaptation in block 102, the model parameters of the pressure model 103, such as, for example, equivalent flow resistance, equivalent line inductance and pressure-volume characteristic or pressure-volume characteristic of the wheel cylinder and the HZ or THZ, are adapted by means of the temperature, for example the vehicle ambient temperature or by means of the temperature measured by a temperature sensor at a magnetic valve or the temperature-proportional resistance measurement of the magnetic valve. The adaptation specification may be determined and stored, in this case, during the development of the system in temperature tests. The parameters of the hysteresis simulation mentioned above can also be adapted depending on the temperature. Various vehicle-specific parameters, such as, for example, line lengths or time for switching the magnetic valve on and off, can be measured at the first start up of the vehicle or programmed from a data file. For this purpose, either the model parameters are stored in a table depending on the temperature or the model parameters are calculated and passed to the model. If, for example, changes should occur in the transition behaviour, it is also possible by means of the adaptation, to adjust the parameters of the model. The equalisation of the pressure model and therefore the parameters of the pressure model may take place several times consecutively or at short time intervals if the pressure model deviates from the actually measured values. The pressure model is continuously also calculated and, in particular in conjunction with the pressure modulation in ESP/ABS 104 or other superordinate controllers, is very important for the accuracy of the pressure setting. The wheel cylinder pressures $p_R(t)$ from the pressure model are fed to the ABS/ESP controller. The ESP/ABS controller 104 and, in particular, the pressure control or pressure adjustment 106 are dependent on wheel brake pressures $p_R(t)$ as control variables. The ESP/ABS controller calculates a wheel brake desired pressure $p_{Rsoll}(t)$ on the basis of the ABS/ESP sensor signals such as wheel speed, lateral acceleration, yaw rate etc. Alternatively, the wheel brake desired pressure $p_{Rsoll}(t)$ may also only be a differential pressure or be extended by the pressure gradient with respect to its information content. The wheel brake desired pressure is obviously calculated individually for each wheel.

In order to prioritise the sequences of the pressure controller 106, the function block "prioritisation device" 105 is also connected upstream of the pressure controller and, on the basis of the various signals which are used to determine the priorities 108, for example wheel slip, parameters of the vehicle transverse dynamics, pressure control deviation etc., makes the wheel selection 109. The wheel selection predetermines to the pressure controller 106, which pressure of which wheel brake(s) he has to adjust next. For example, a pressure reduction request has a higher priority than a requested pressure reduction at another wheel and is therefore carried out first. It is also not permitted, for example, to carry out two pressure generations one after the other at one wheel without having attended to another wheel in the meantime. The prioritisation additionally relates to the decision whether an individual wheel, or simultaneous pressure generation or pressure reduction has to take place and how many wheels are involved with this. The wheel speed, wheel acceleration, cornering, µ-jump (positive and negative), µ-split road and instant of control are preferably the criterion for the prioritisation. If, for example, in the first control cycle, an exceeding of the desired slip or a wheel acceleration threshold is determined at several wheels, in accordance with the number of wheels involved, a switch is made to simultaneous or partially simultaneous. If, during a pressure reduction of a wheel, an exceeding of the desired slip with higher wheel acceleration, for example −5 g, occurs at another wheel, this is adjusted partially simultaneously. If the control cycle is virtually ended, no further switchover takes place. The respective desired values for slip and acceleration for simultaneous or partially simultaneous are changed during cornering in the direction of smaller values in order to obtain full stability. With higher simultaneous wheel re-accelerations, for example as a result of a corresponding coefficient of friction change of the road, a switch can also be made at corresponding slip values to simultaneous or partially simultaneous. I.e., in all cases in which a gain of braking path or driving stability can be achieved, the switch to simultaneous or partially simultaneous takes place. For the person skilled in the art this means that an optimal slip must be present.

The respective time sequences, as shown in FIG. 2 and FIG. 3, are then calculated by the pressure control or adjustment 106. The requested HZ piston stroke is then calculated by means of stored pressure-volume characteristics here, taking into account the hysteresis of the wheel cylinders. An ideally subordinate position controller then adjusts the desired piston stroke by means of control signals 11. For this purpose, the respective switching valves 17*a*, 17*b*, 17*c*, 17*d* are activated 110 in the correct time sequence.

It is certainly conceivable for the pressure model 103 to be used to estimate future wheel pressures. This may, in particular, be important for the pressure control 106 in order to calculate the correct valve switching instants. The determined values may be intermediately stored, in this case, in a memory.

LIST OF REFERENCE NUMERALS

1-9 phases in the control cycle
$p_{HZ}$ main cylinder pressure
$p_R$ wheel cylinder pressure
$p_{Rsoll}$ wheel cylinder desired pressure
$p_{auf}$ pressure generation
$p_{ab}$ pressure reduction
$p^*_{ab}$ pressure change speed on pressure reduction
$p^*_{an}$ pressure change speed on pressure generation
$s_k$ HZ piston stroke
$s^*_k$ HZ piston speed
$T_E$ settling time before closing of the valve
$T_{um}$ switching time from the beginning of the piston movement to the opening of the valve
$T_{MUX}$ total time in order to adjust the desired pressure at one or more wheels
$t_v$ delay time to the closing of the magnetic valve
a transition course in the pressure time behaviour with settling time before the closing of the valve
b transition course in the pressure time behaviour during hard valve closing without settling time
$MV_i$ magnetic valve/switching valve
$U_{MV}$ voltage course 2/2-way magnetic valve
RL flow resistance in the line from the magnetic valve to the working chamber of the piston cylinder system
RV flow resistance in the magnetic valve
$RV_R$ flow resistance of the hydraulic line from the magnetic valve to the wheel cylinder
10 EC motor
11 spindle
12 spindle resetting device
13 angle of rotation sensor (position sensor)
14 HZ or THZ
15 pressure line from the pressure rod piston
16 pressure line from the floating piston
17*a*-17*d* 2/2-way magnetic valves and switching valves
18*a*-18*d* wheel cylinder
19 pressure sensor
101 actuator, hardware in the electronic system and sensor system
102 software function block "calculation specification or adaptation of the pressure model parameters"
103 software function block "pressure model"
104 software function block "ABS/ASR/ESP controller"
105 software function block "prioritisation"
106 software function block "pressure control or adjustment"
107 sensor signals of the ESP/ABS sensor system
108 signals to determine the priorities
109 signal to specify the wheel selection
110 activation of the switching valves
111 activation, motor
112 desired wheel pressures $p_{Rsoll}(t)$
121 main cylinder pressure $p_{HZ}(t)$
122 differential pressure to determine the pressure flow
123 hydraulic line inductance
124 dQ/dt
125 integrators
126 through-flow Q
127 flow resistance of the path from the piston cylinder system (14, HZ) via the switching valve (17*a*, 17*b*, 17*c*, 17*d*) to the wheel cylinder
128 pressure drop at 127
129.*i* current volume at the wheel
130 volume-pressure characteristic (capacity) of the wheel cylinder and the associated connection lines
131 wheel cylinder pressure $p_R(t)$
132 volume-pressure characteristic (capacity) of the main brake cylinder with the switching valves closed
133 current volume in the main brake cylinder
134 summation block
135 HZ piston stroke $s_K(t)$

The invention claimed is:

1. A braking system including:
a brake booster comprising a piston-cylinder system driven, by transmission means, mechanically or hydraulically, by an electric motor, the piston-cylinder system including at least one working chamber;
hydraulic lines arranged to couple the at least one working chamber of the piston-cylinder system to at least two wheel brakes;
respective 2/2-way switching valves allocated to the respective at least two wheel brakes and arranged to separately or jointly close the hydraulic connection so that a pressure can be adjusted in the wheel brakes one after the other using a multiplex method and/or simultaneously;
a control device configured to control the electric motor and the switching valves,
wherein a hydraulic connection line from a working chamber of the piston-cylinder system to a respective magnetic valve has a dimensioned flow resistance $RL_i$, and each switching valve has a dimensioned flow resistance $RV_i$, and the hydraulic line to a respective wheel cylinder has a flow resistance $RVR_i$, wherein the flow resistances $RL_i$ and $RV_i$ are sufficiently small enough to enable piston speed to determine a pressure reduction gradient and pressure generation gradient in each wheel brake, the flow resistance $RL_i$ being smaller than the flow resistance $RV_i$ and wherein the control device is configured to adjust or control the piston movement and piston speed during the pressure generation and pressure reduction as a function of a pressure-volume characteristic of the wheel brakes,
wherein the control device continuously calculates the pressure levels of the wheel brakes using a pressure model, wherein the pressure model uses, as a model parameter, an equivalent flow resistance, which corresponds to the hydraulic resistance of the path from the piston-cylinder system via the switching valve up to the wheel cylinder of the wheel brake.

2. The braking system according to claim 1, wherein the flow resistance $RV_i$ is greater than the flow resistance $RL_i$ by a factor of 1.3 to 2.5.

3. The braking system according to claim 1, wherein the maximum achievable pressure gradient of the piston-cylinder system when the switching valves are closed is greater by at least a factor of 2 than the maximum achievable pressure gradient in the wheel brakes when at least one switching valve is open.

4. The braking system according to claim 1, wherein a sum of the flow resistances $RL_i$ and $RV_i$ associated with a respective wheel brake is configured such that, with a maximum dynamic of the piston-cylinder system and the drive thereof, and with at least one opened switching valve, because of the simultaneous volume intake or volume output of the wheel brakes in the time during which the switching valves are open, no pressure equalisation takes place between the wheel brakes.

5. The braking system according to claim 1, wherein the control device is configured to control a respective switching valve by means of a pulse width modulation (PWM).

6. The braking system according to claim 1, wherein the hydraulic connection line from the working chamber of the piston-cylinder system to the respective magnetic valve is shorter than 30 cm.

7. The braking system according to claim 1, wherein the pressure in each wheel brake is adjusted on the basis of the pressure-volume characteristic of the respective wheel by means of a stroke control of the piston of the piston-cylinder system.

8. The braking system according to claim 1, wherein a superordinate controller predetermines a desired pressure for the piston-cylinder system.

9. The braking system according to claim 1, wherein a pressure gradient to be calculated in the piston-cylinder system is a function of an amount of required pressure change in a wheel brake.

10. The braking system according to claim 1, wherein an input variable of the pressure model is an actual pressure in the piston-cylinder system or the piston stroke.

11. The braking system according to claim 1, wherein the pressure model within the hydraulic path from the piston-cylinder system via the switching valve-up to the wheel cylinder of the wheel brake takes into account a weighting of the flow conditions laminar and turbulent.

12. The braking system according to claim 1, wherein the pressure model calculates a closing instant of a respective switching valve as a function of calculated actual pressure and current pressure, as well as switching times of the magnetic valves determined in an end test by measurement, and a respective pressure gradient.

13. The braking system according to claim 1, wherein the pressure model takes into account, as a model parameter, a hydraulic equivalent inductance, which reflects mass and/or inertia of the brake fluid.

14. The braking system according to claim 1, wherein the pressure model contains, as a model parameter, the pressure-volume characteristic of each individual wheel brake, which represents the capacity or volume intake of the wheel brake.

15. The braking system according to claim 1, wherein one or more model parameters of the pressure model are a function of ambient temperature of the switching valves or are adapted by means of the temperature.

16. The braking system according to claim 1, wherein the control device corrects or adjusts the pressure model when at least one predetermined slip is not achieved.

17. The braking system according to claim 1, wherein the control device checks the pressure model and/or equalises values and parameters thereof, wherein the control device determines the actual pressure in the piston-cylinder system when the switching valve is open after waiting for a pressure settling time.

18. The braking system according to claim 1, wherein hysteresis contained in the hydraulic system is also accounted in the pressure model.

19. The braking system according to claim 18, wherein the control device carries out checking and adjustment of the pressure model several times, one after the other or at short time intervals, when the pressure model differs from actually measured values.

20. The braking system according to claim 1, wherein a time difference between the beginning of the piston movement and the switchover of a switching valve is variable in such a way that it can be controlled by means of the piston speed.

21. The braking system according to claim 1, wherein the control device calculates the respective pressure in the wheel brakes by means of the pressure model and transmits the calculated pressure values at least to an ABS/ESP controller and a pressure control device the pressure control device at least activating the 2/2-way switching valves and the electric motor, and wherein a prioritisation device carries out a wheel selection, at least with the aid of data transmitted by the ABS/ESP controller, and transmits it to the pressure control device.

22. The braking system according to claim 1, wherein the control device adapts pressure model parameters with the aid of at least one temperature determined in the braking system or at specific points in the braking system.

23. The braking system according to claim 21, wherein the prioritisation device carries out the prioritisation of the wheel selection based at least in part on at least one criterion selected from the group consisting of: "optimal braking path" and "stability of the control".

24. The braking system according to claim 21, wherein the prioritisation device does not simultaneously permit a pressure generation in one or more wheel brakes during a pressure reduction currently taking place in one or more wheel brakes, and vice versa.

25. The braking system according to claim 21, wherein the prioritisation device switches to simultaneous or partially simultaneous pressure generation or pressure reduction during a wheel slip greater than a slip limit value and/or during a wheel acceleration or deceleration of greater than 5 g or −5 g.

26. The braking system according to claim 1, wherein a second arithmetic unit carries out a plausibility test of the input and output signals of the entire control loop.

27. A method for adjusting a brake pressure in at least one wheel brake using a braking system according to claim 1, comprising generating or reducing, by the braking system according to claim 1, the pressure in at least two wheel brakes consecutively, simultaneously, or overlapping with respect to time.

28. A method for adjusting a brake pressure in at least one wheel brake using a braking system according to claim 1, comprising selecting, by the braking system according to claim 1, during simultaneous pressure generation or pressure reduction in at least two wheel brakes, the pressure difference between the working chamber of the piston-cylinder system and the respective wheel brakes to be so great that no pressure equalisation takes place between the respective wheel brakes.

29. The method according to claim 28, further comprising readjusting the piston of the piston-cylinder system by the control device to maintain the pressure difference when the switching valves are open.

30. The method according to claim 29, further comprising: calculating, by the control device, the necessary pressure difference and therefore the required volume change of the working chamber of the piston-cylinder system, at which no volume equalisation takes place between the wheel brakes, the associated switching valve of which is open or the opening of which is immediately immanent; and readjusting or activating, by the control device, the piston of the piston-cylinder system for pressure control to adjust the required differential pressure.

31. A method for adjusting a brake pressure in at least one wheel brake using a braking system according to claim 1, comprising generating and/or reducing, by the braking system according to claim 1, pressure in at least two wheel brakes simultaneously and/or overlapping with respect to time, the starting level of the respective wheel brakes being different from one another.

32. A method for adjusting a brake pressure in at least one wheel brake using a braking system according to claim 1, comprising equalizing, by the braking system according to claim 1, the pressure-volume characteristic of each wheel brake by static comparison of the piston stroke with the pressure in the working chamber of the piston-cylinder system before the start of travelling.

33. A method for adjusting a brake pressure in at least one wheel brake using a braking system according to claim 1, comprising adjusting or controlling, by the braking system according to claim 1, the pressure in the working chamber of the piston-cylinder system, before the beginning of the pressure reduction, to the pressure in the respective wheel brake or a lower pressure; and opening thereafter the switching valve associated with the respective wheel brake by the control device.

34. A method for adjusting a brake pressure in at least one wheel brake using a braking system according to claim 1, comprising adjusting or controlling, by the braking system according to claim 1, the pressure in the working chamber of the piston-cylinder system, before the beginning of the pressure generation, to a pressure in the respective wheel brake or a higher pressure; and opening thereafter the associated switching valve by the control device.

* * * * *